United States Patent
Qian et al.

(10) Patent No.: US 11,966,325 B2
(45) Date of Patent: Apr. 23, 2024

(54) CODELESS AUTOMATIC TESTING FRAMEWORK

(71) Applicant: SAP SE, Walldorf (DE)

(72) Inventors: Hongjun Qian, Shanghai (CN); Zhixiang Xia, Shanghai (CN); Qian Xu, Shanghai (CN); Xiaoyu Wang, Shanghai (CN)

(73) Assignee: SAP SE, Walldorf (DE)

( * ) Notice: Subject to any disclaimer, the term of this patent is extended or adjusted under 35 U.S.C. 154(b) by 92 days.

(21) Appl. No.: 17/728,204

(22) Filed: Apr. 25, 2022

(65) Prior Publication Data
US 2023/0342286 A1 Oct. 26, 2023

(51) Int. Cl.
G06F 9/44 (2018.01)
G06F 11/36 (2006.01)

(52) U.S. Cl.
CPC ...... G06F 11/3684 (2013.01); G06F 11/3688 (2013.01)

(58) Field of Classification Search
None
See application file for complete search history.

(56) References Cited

U.S. PATENT DOCUMENTS

| | | | |
|---|---|---|---|
| 11,379,258 B1 * | 7/2022 | Perea Ramos | G06F 11/3688 |
| 2017/0300402 A1 * | 10/2017 | Hoffner | G06F 11/3684 |
| 2018/0089066 A1 * | 3/2018 | Barnett | G06F 11/3688 |
| 2020/0167268 A1 * | 5/2020 | Sabanayagam | G06F 11/3676 |
| 2022/0100642 A1 * | 3/2022 | Danthuluri | G06F 11/3688 |

* cited by examiner

*Primary Examiner* — Qamrun Nahar
(74) *Attorney, Agent, or Firm* — Buckley, Maschoff & Talwalkar LLC

(57) ABSTRACT

According to some embodiments, systems and methods are provided including an automatic testing (AT) framework including an automatic testing (AT) tool and an AT engine; a processing unit coupled to the automatic testing framework to: generate a JSON file, wherein the JSON file is a test case; upload the generated test case to a database of the AT framework; and execute the test case in response to uploading, wherein execution further comprises: reading the test case from the database; validating the JSON file matches a JSON schema; mocking the test case to generate an executable test, including one or more nullable values based on the generated JSON file; executing the executable test to generate an output; and verifying the generated output by comparing the generated output to an expected output in the test case. Numerous other aspects are provided.

19 Claims, 19 Drawing Sheets

202

```
{
    "id":1,
    "name":"Test Case 1",
    "documents":{
            "invoice",
            "payment",
            "bank statement"
            }
}
```

FIG. 2A

```
{
        "$schema": "http://json-schema.org/draft-04/schema#",
        "$id": "https://example.com/fundtracker.schema.json",
        "title": "Fund Tracker",
        "description": "This document records the flow of funds",
        "type": "object",
        "properties":{
                "id":"
                        "description":"A unique identifier of a test case",
                        "type": "number"
                }
                "name":{
                        "description":"Full name of test case",
                        "type": "string"
                }
                "documents":{
                        "Description"":"documents to track fund flow",
                        "type":"array"
                        "properties":{
                                "invoice":{
                                        "type":"object"
                                        "items":{
                                                "description":"list of
items purchased and associated cost",
                                                "type": "string"
                                .
                                .
                                .
                                                }
                                        }
                                }
                        }
}
```

FIG. 2B

| COLUMN | DESCRIPTION | |
|---|---|---|
| MANDT | CLIENT | |
| CASE_ID | TEST CASE ID | |
| CASE_TYPE | CASE TYPE | ─302 |
| DESP | DESCRIPTION OF TEST CASE | |
| EXCLUDED | EXCLUDED FROM AUTOMATIC RUN; | |
| CREATED_BY | CREATED BY | |
| CREATED_AT | CREATED AT | |
| CHANGED_AT | CHANGED AT | |
| CASE_CONT | CASE CONTENT | ─304 |
| SEARCH_KEY1 | SEARCH KEY1 | ─306 |
| SEARCH_KEY2 | SEARCH KEY2 | |
| SEARCH_KEY3 | SEARCH KEY3 | |
| SEARCH_KEY4 | SEARCH KEY4 | |
| SEARCH_KEY5 | SEARCH KEY5 | |

| Table Entry | Edit | Goto | Settings | System | Help |

Data Browser: Table FCLM_FB_TESTCASE Select Entries 4

| MANDT | CASE_ID | SEQ_ID | CASE_TYPE | DESP | EXCLUDED | CREATED_AT | CHANGED_AT | CASE_CONTENT |
|---|---|---|---|---|---|---|---|---|
| 500 | 001_AR_CO | 00001 | | CUSTOMER INVOICE FB70 CREATE TEST | | 20,210,617,022,133,6925020 | 0,0000000 | {"VERSION":2,"INPUTS":"001_AR_... |
| 500 | 001_AR_INCO | 00001 | I | CUSTOMER INVOICE FB70 CREATE IN | | 20,210,617,022,133,6925020 | 0,0000000 | {"VERSION":2,"INPUTS":"001_AR_... |
| 500 | 001_AR_INCO | 00002 | I | CUSTOMER INVOICE FB70 CREATE IN | | 20,210,617,022,133,6925020 | 0,0000000 | {"VERSION":2,"INPUTS":"001_AR_... |
| 500 | 001_AR_OUTCO | 00001 | O | CUSTOMER INVOICE FB70 CREATE OUT | | 20,210,617,022,133,6925020 | 0,0000000 | {"VERSION":2,"INPUTS":"001_AR_... |

| Program  Edit  Goto  System  Help |

Flow Builder

Control Parameters

Running Type: Liquidity Analysis: Mass Run for Financial Acco... ▼
☐ Test Run
Show Result: Show Application Log ▼

FI Process Option

1702 {
Start Item: Input ▼
☑ Merge Tax Items
☐ Overwrite AdjActFlow
☐ Show Traceability Results
}

Technical Option

Package Size: 200.000
☐ Keep Error in Mass Run
Log Level: Normal ▼
☐ Parallel Run

Selection Criteria of FI Doc

| Company Code | | to | |
| Fiscal Year | | to | |
| Document Number | | to | |
| G/L Account | | to | |
| Document Date | | to | |
| Posting Date | | to | |
| Document Type | | to | |

*FIG. 17*

CODELESS AUTOMATIC TESTING FRAMEWORK

BACKGROUND

Organizations use software to perform a variety of functions. During development, the software code may be tested to verify whether the behavior of the code is as per the expectations. In particular, each unit (e.g., smallest piece of code that can be logically isolated and tested in such isolation) of the code may be automatically tested. Unit testing is used to test the functionality of a system and its various components. It is conventionally performed by domain and configuration experts who know the functionality of each unit in a system. Each unit does its intended task by means of the logic written within it. This will result in certain effects, depending upon the given conditions. These effects can broadly be: changes to the state of the system and communication with other units. For changes to the state of the system, changes made to the concerned variables may be verified in the unit testing results. For communication with other units, whether the call/invocation is made or not, this may be verified in the unit testing results. Any given unit will exhibit multiple behaviors depending on the scenario. Each such scenario is a "test case". Conventionally, to create the test case, a user may work with a developer. The user may give any requirements for the test case to the developer and the developer will create the code for the test case in the system. The code created by the developer may be complex and may take into account some predefined system settings that may be unknown to the user. Additionally, there may be a lot of back-and-forth interactions between the user and the developer to generate an appropriate test case that meets the user goals.

Systems and methods are desired which make it easier for the user to generate a test case.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a JSON file according to some embodiments.

FIG. 2B is a JSON schema of the JSON file of FIG. 2A according to some embodiments.

FIG. 3 is a diagram of a non-exhaustive example of a test case storage according to some embodiments.

Figure 13:
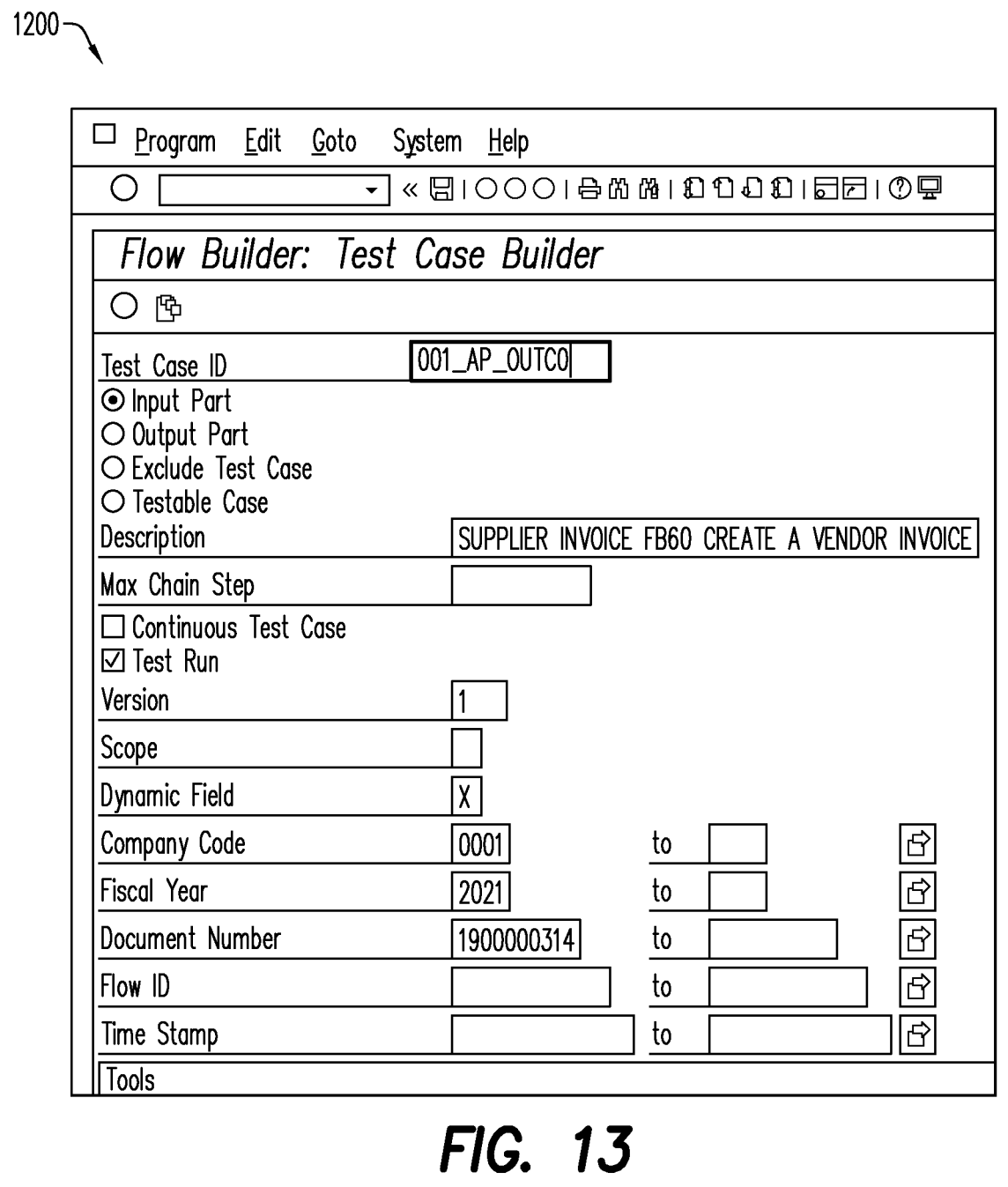

FIG. 13 is a user interface (UI) according to some embodiments.

FIG. 16 is a user interface (UI) according to some embodiments.

FIG. 17 is a user interface (UI) according to some embodiments.

Figure 1:
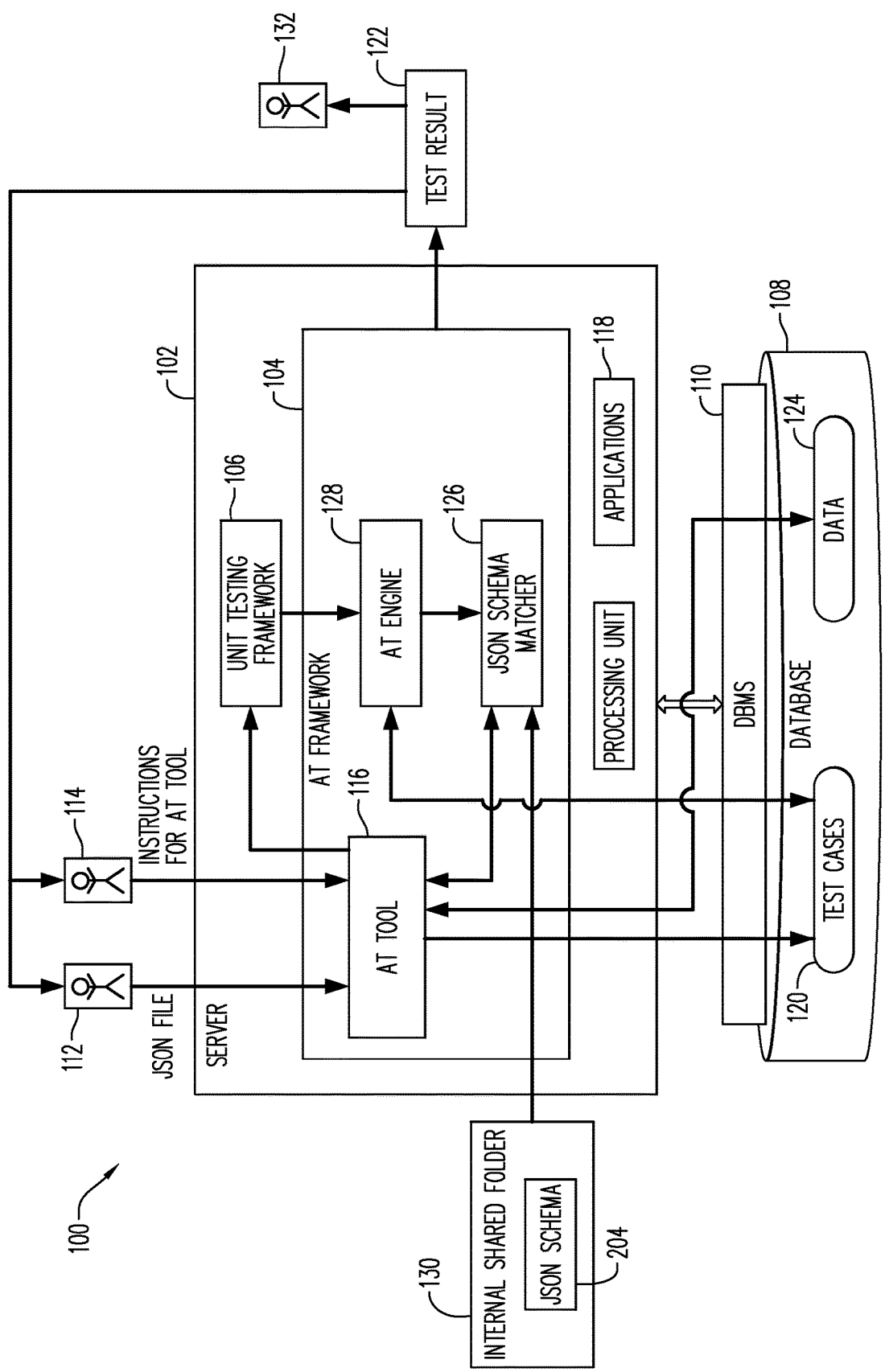
FIG. 1 is a diagram illustrating a system architecture according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, automatic testing, via test cases, is a major measure to ensure quality of a software product. Conventionally, the test cases are written in code to ensure they are logically correct for a particular environment. As such, it may be difficult for a non-technical user to create a test case to test functionality of a system. As a non-exhaustive example, consider a cash management group. They may want to track cash flows from a source (original) document by tracing the movement of money via different documents. The tracking may be based on virtually clearing open items in the preceding and subsequent documents, which results in precise amount, date, and account assignment. For example, an incoming invoice is cleared via an output payment. After that, the amount can be found in a bank clearing account (bank statement) for outgoing payments. Posting on the bank clearing account is categorized as cash in transit. Then the bank clearing account is debited and the transaction is posted at which point the bank clearing account is cleared. This posting is categorized as cash. In this example, there are three documents to trace: 1. Invoice, 2. Payment 3. Bank statement. An organization may have an application that can perform the tracking, and a user may want to write a test case to determine whether the application tracks the cash flow, as expected. Conventionally, in addition to the data sources that may be accessed by the test case, the test case is also dependent on the settings of a given system/configuration of the test case flow builder (e.g., activation, stop condition, etc.) and that information may be coded into the test case. This information may involve many steps to prepare the case and may be too difficult for a non-technical user to configure, resulting in a developer writing the test case. Additionally, conventional test cases may include values in all of the fields in a given program, even if the user is only interested in some of the fields. This too may be difficult for a non-technical user to account for.

One or more embodiments provide an Automatic Testing (AT) framework including an automatic testing (AT) tool and automatic testing (AT) engine. The AT framework may allow a non-technical user ("user") to generate a test case on their own (e.g., without a developer). The user may generate the test case via writing (with any text editor) a JavaScript Object Notation (JSON) file that is received by the AT tool or by using the AT tool to assist in the generation of the JSON file. JSON is a text-only language-independent data format. The generated test case may follow a JSON schema that defines the communication between the test case and the AT framework. The AT framework generates the test case with the appropriate schema-based format with all the necessary inputs/configurations/variants/outputs. The test case is then stored in a database and tested by the AT engine. By using the JSON file to create the test case, the user is able to create a codeless test case. The codeless aspect of the test case may also allow the test case to be executed in any system without additional setup. Conventional testing normally requires a lot of pre-requisites, including up-to-date configurations/customizing, pre-configured master data, etc., as well as fundamental system-wide requirements to execute the test cases automatically. The codeless aspect allows the test case and testing to be executed without relying on any particular configuration/customizing/master data, as this information is already included in the JSON file test case. By having the user create the test case, instead of the developer, the user may more easily create a test case that is better directed to testing the functionality, thereby improving application quality. The use of the JSON file for the test case may also provide for minimal modification to an original test case to provide additional test cases, as well as provide for the storage of multiple result sets and input parameters. Through different test cases, different aspects of a data set may be combined and judged, allowing the data to be checked at each integration point in an integration test.

Embodiments may also use a null value in fields the user does not want to test, making each test case focus on the fields the user cares about. The null value excludes that field's validation from the testing. For example, a test case that verifies particular fields may ignore other fields—like document line-item number. The test case in this example would remain unchanged, even though the logic of the document line-item number has changed by being a null value, as only the necessary fields to be tested are maintained in the test case. With conventional testing systems, all fields may be maintained in a data container, and all of the values in the data container may be checked as part of the test case. To that end, a value maintained in a data container table has only two possibilities—non-space value and space, while embodiments provide three possibilities—null, non-space value, and space.

FIG. 1 is a block diagram of system architecture 100 according to some embodiments. Embodiments are not limited to architecture 100.

Architecture 100 includes a server 102, an AT framework 104, a unit testing framework 106, a database 108, a database management system (DBMS) 110, a JSON-experienced user 112, a JSON-inexperienced user 114. The AT framework 104 may provide a framework to allow technical and non-technical users easily write organization-driven test cases. The AT framework 104 may include an AT tool 116 running an application 118. The server 102 may also include other applications 118. Applications 118 may comprise server-side executable program code (e.g., compiled code, scripts, etc.) executing within the server 102 to receive queries/requests from clients 112, 114, and provide results (e.g., test case 120 and test results 122) to clients 112, 114 and/or a developer 132 based on the data of database 108, schema 204 and the output of the AT framework 104. A client 112, 114 may access the AT framework 104 executing within the server 102, to generate and/or execute test cases, as described below.

The server 102 may provide any suitable interfaces through which users 112, 114 may communicate with the AT framework 104 or applications 118 executing thereon. The server 102 may include a Hyper Text Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

The AT tool 116 may be an application that can be used by users to upload a JSON file 202 (FIG. 2A), in the case of the JSON-experienced user 112; and generate/write a JSON file 202 in the case of the JSON-inexperienced user 114.

As described above, a JSON file 202 is s text-only language-independent data format. A JSON file 202 uses human-readable text to store and transmit data objects consisting of attribute-value pairs and arrays. Continuing with the tracking funds example described above, the JSON file 202 here in FIG. 2A assigns the test case an ID, and includes the documents that will be accessed to execute the test case.

A JSON schema 204 (FIG. 2B) is a vocabulary that provides for the annotation and validation of JSON documents 202. The JSON schema 204 defines the structure, content and (to some extent) semantics of JSON objects, and may be used to require that a given JSON document satisfies a certain number of criteria. The criteria may be asserted by using keywords. The JSON schema 204 may specify metadata about what an object's properties mean and what values are valid for those properties. The JSON schema may describe the existing data format for the JSON document being validated, provide clear human- and machine-readable documentation, and may be used to validate the data. The JSON schema 204 may be a document and/or set of files containing the definition/description for the JSON file. The JSON schema 204 may be written by a developer prior to the generation of any test case. The JSON schema 204 may be stored in an internal shared folder 130 (e.g., internal GitHub). The JSON file may be considered media which obeys the JSON schema. The JSON file is written per the rules in the JSON schema, and the JSON file is defined as a test case which will be loaded and tested by the AT framework 104. The JSON schema document 204 may be identified by a Uniform Resource Identifier (URI). The JSON schema 204 may define a communication agreement between the test case/JSON file and the other elements of the AT framework 104, as without following the rules defined by the JSON schema 204, the JSON file/test case may not be executed. Here, in FIG. 2B, the JSON schema 204 includes "$schema" which states that this schema complies with a particular version of the Internet Engineering Task Force (IETF) standard; "$id" which defines the basic URI to resolve other URI references within the schema; "title" which describes the intent of the schema; "description" which gives the description of the schema; "type" which defines the type of data; and "properties" which defines various keys and their value types within a JSON document. Other suitable keywords and properties may be included in a JSON schema.

The AT framework 104 may also include a JSON Schema Matcher ("Validator") 126 and an AT engine 128.

The JSON Schema Matcher 126 may structurally validate the JSON file 202 with the JSON schema 204 (i.e., validate the JSON file is properly formatted (matches) with the JSON schema). The JSON Schema Matcher 126 may receive the JSON file 202 from the AT tool 116, and the JSON schema 204 from the internal shared folder 130, and determine whether they match (i.e., each object within the JSON file satisfies the respective constraints in the JSON schema). After the JSON Schema Matcher 126 determines the JSON file 202 matches the JSON schema 204, the JSON Schema Matcher 126 may return a validation message to the AT Tool 116. The AT Tool 116 may then store the JSON file 202 as a test case 120 in the database 108. The JSON file 202 of the test case 120 may include inputs, configuration and master data, variants, and outputs. As described below, the AT tool 116 may combine separate input and output files in a single test case file, and during the combination, may add in the configuration/master data and variants. The AT framework 104 has the built-in utility tools to generate test cases with the given schema-based format with all of the necessary inputs/configurations/variants/outputs. Alternatively, the JSON-experienced user may include the inputs, configuration/master data, variants and output when writing the single JSON test case file.

The test case 120 may be stored in a table 300 (FIG. 3). The table 300 may include a case type 302 having one of three values: (blank) for testable test cases, "I" for Test case input, and "O" for Test case output. The case content 304 may contain the JSON file. The Search Keys 306 may use a tag concept that supports free searching for the cases. The table 300 may include other suitable fields (e.g., case id, description, excluded, created_by, created_at, changed_at, etc.).

In embodiments, saving the test case 120 to the database 108 may trigger the Unit Testing (UT) Framework 106, which in turn triggers the AT engine 128 to prepare the test case 120 for testing. The UT Framework 106 may receive the output of the test case execution, and in a case the output indicates a failure, the UT Framework 106 may notify appropriate parties (e.g., email notification to users 112/114 and/or developers 132, administrators, etc.).

Figure 4:
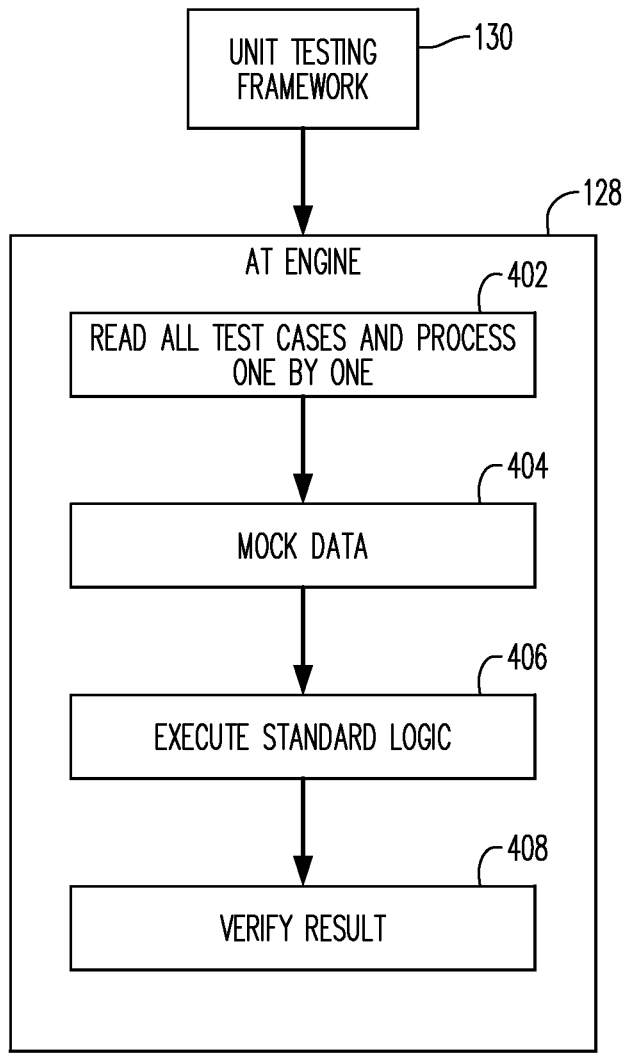
FIG. 4 is a diagram illustrating the AT engine of FIG. 1 according to some embodiments.

The AT engine 128 (FIG. 4) may read the test case 120 from the database 108 and translate the test case into a structure for execution. The AT engine is registered in the normal UT classes. At 402, the AT engine 128 reads and processes each case individually. The AT engine 128 translates the JSON file from the test case 120 (for example, shown in FIG. 3) into other database tables used by the UT framework in execution of the test case. Then at 404, the AT engine 128 mocks up the translated database tables per the existing UT Framework 106. Mocking is a process used in unit testing when the unit being tested has external dependencies. The purpose of mocking is to isolate and focus the code being tested. Mocking creates mock database objects ("test doubles") that replace real objects with which the code under test collaborates. The test double may be defined locally and have exactly the same name, same structure same keys, and same point of contact with Open SQL statements as that of the actual table. The test double may provide the same interface (the same point of contact) as the real object so that the code under test (CUT) (i.e., the actual production code being tested) thinks that it is the real one. Next, at 406, the AT engine 128 executes the standard logic and outputs a test result 122. For execution of the test case, the AT engine 128 calls objects which need to be tested. The AT engine 128 then verifies the results at 408. The AT engine 128 compares the results of the execution with expected results stored in the test case output part.

One or more applications 118 executing on server 102 may communicate with DBMS 110 using database management interfaces such as, but not limited to, Open Database Connectivity (ODBC) and Java Database Connectivity (JDBC) interfaces. These types of applications 118 may use Structured Query Language (SQL) to manage and query data stored in database 108.

DBMS 110 serves requests to store, retrieve and/or modify data of database 108, and also performs administrative and management functions. Such functions may include snapshot and backup management, indexing, optimization, garbage collection, and/or any other database functions that are or become known. DBMS 110 may also provide application logic, such as database procedures and/or calculations, according to some embodiments. This application logic may comprise scripts, functional libraries and/or compiled program code. DBMS 110 may comprise any query-responsive database system that is or becomes known, including but not limited to a structured-query language (i.e., SQL) relational database management system.

Server 102 may provide application services (e.g., via functional libraries) which applications 118 may use to manage and query the data of database 108. The application services can be used to expose the database data model, with its tables, hierarchies, views and database procedures, to clients. In addition to exposing the data model, server 102 may host system services such as a search service.

Database 108 may store data used by at least one of: applications 118 and the AT framework 104. For example, database 108 may store test cases 120, and other data 124 accessed by the AT Framework 104 during execution thereof.

Database 108 may comprise any query-responsive data source or sources that are or become known, including but not limited to a structured-query language (SQL) relational database management system. Database 108 may comprise a relational database, a multi-dimensional database, an extensible Markup Language (XML) document, or any other data storage system storing structured and/or unstructured data. The data of database 108 may be distributed among several relational databases, dimensional databases, and/or other data sources. Embodiments are not limited to any number or types of data sources.

Users 112/114 may comprise one or more individuals or devices executing program code of a software application for presenting and/or generating user interfaces to allow interaction with the server 102. Presentation of a user interface as described herein may comprise any degree or type of rendering, depending on the type of user interface code generated by the server 102.

For example, a client 112, 114 may execute a Web Browser to request and receive a Web page (e.g., in HTML format) from a website application 118 of server 102 to provide the UI 800, 900, 1200, 1500 and 1600 via HTTP, HTTPS, and/or WebSocket, and may render and present the Web page according to known protocols. The client 112, 114 may also or alternatively present user interfaces by executing a standalone executable file (e.g., an .exe file) or code (e.g., a JAVA applet) within a virtual machine.

Figure 5:
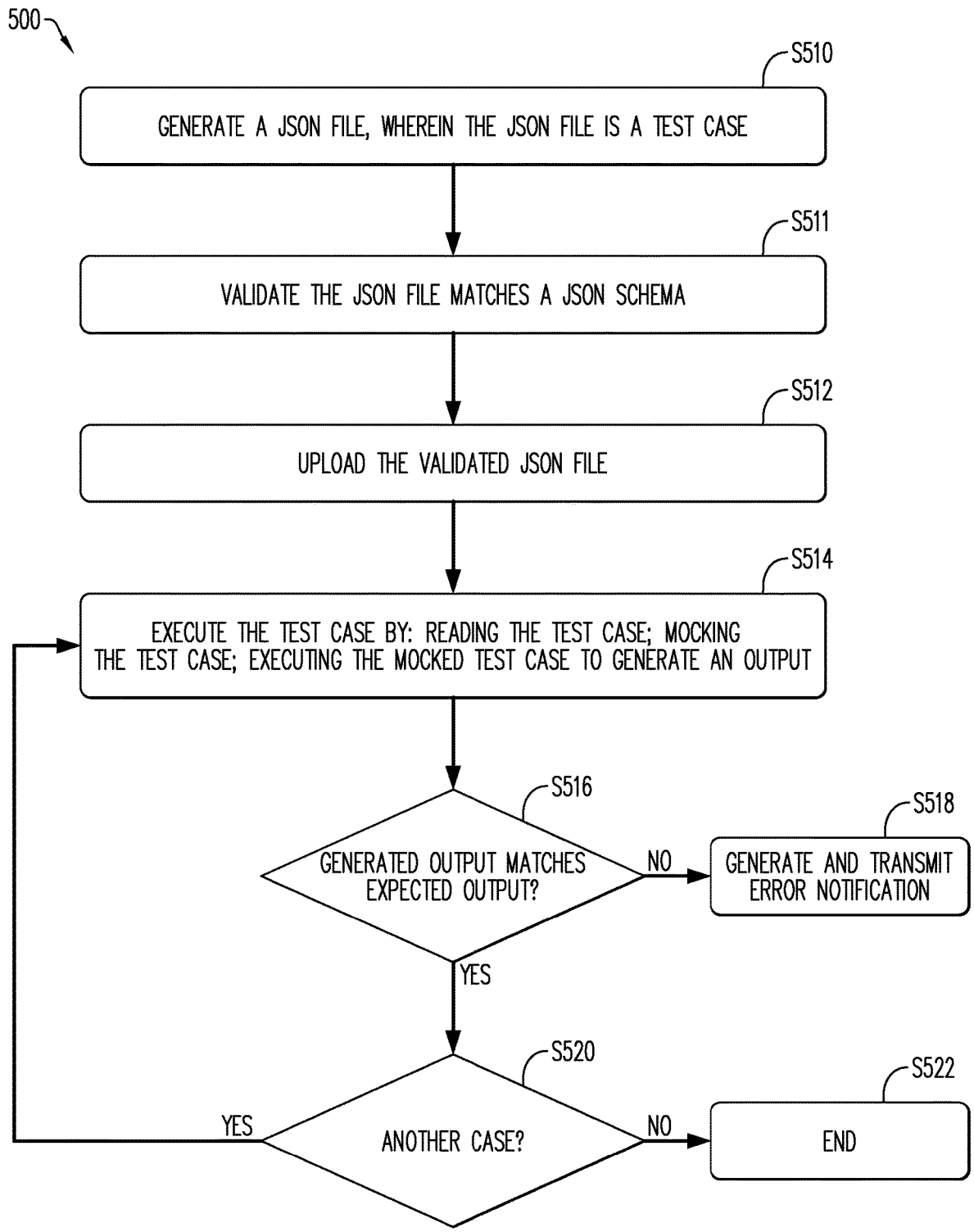
FIG. 5 is a flow diagram of a process according to some embodiments.
Figure 6:
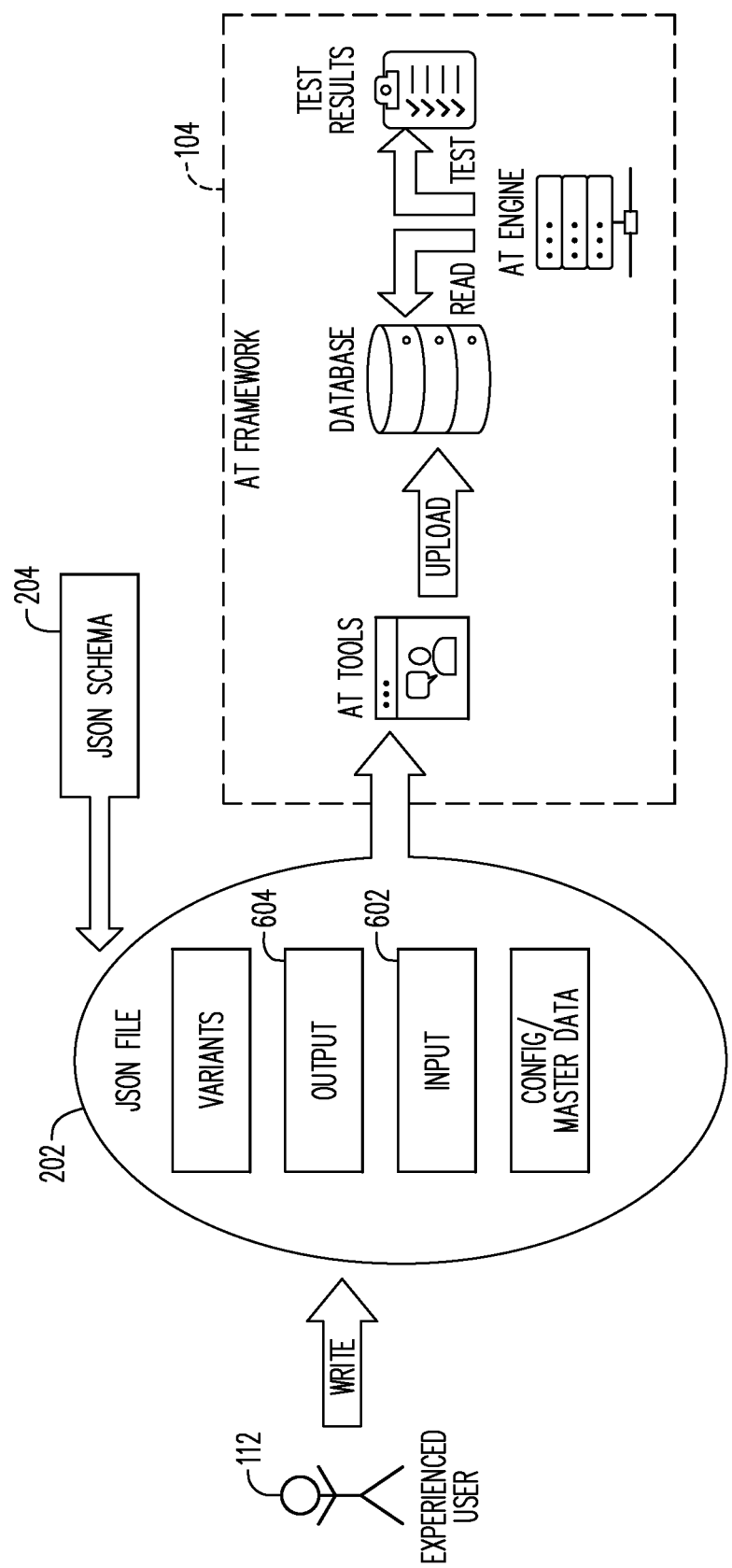
FIG. 6 is a block diagram of a JSON-experienced user flow according to some embodiments.
Figure 7:
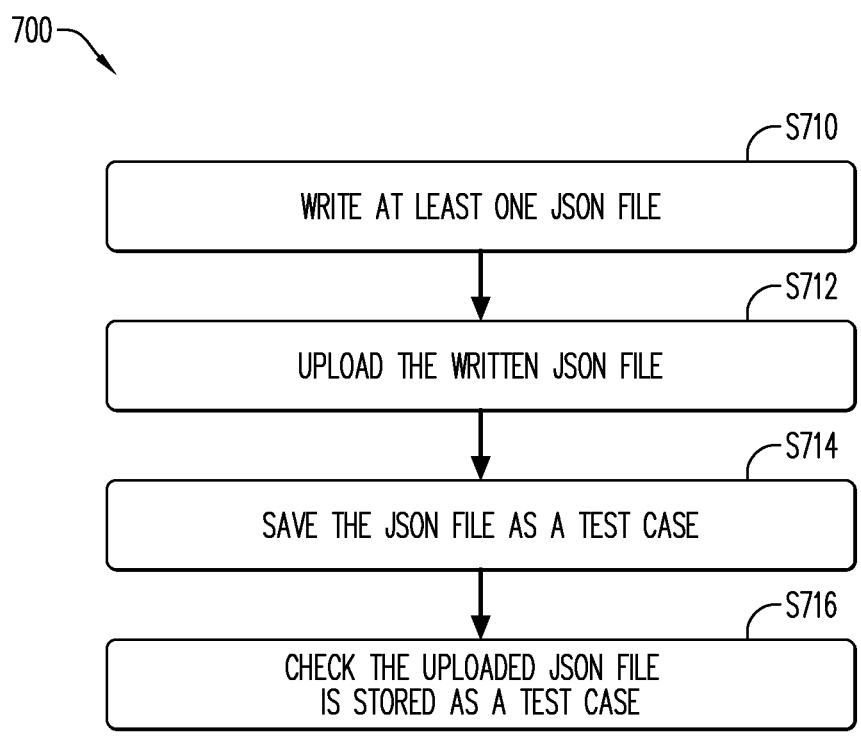
FIG. 7 is a flow diagram of a process according to some embodiments.
Figure 8:
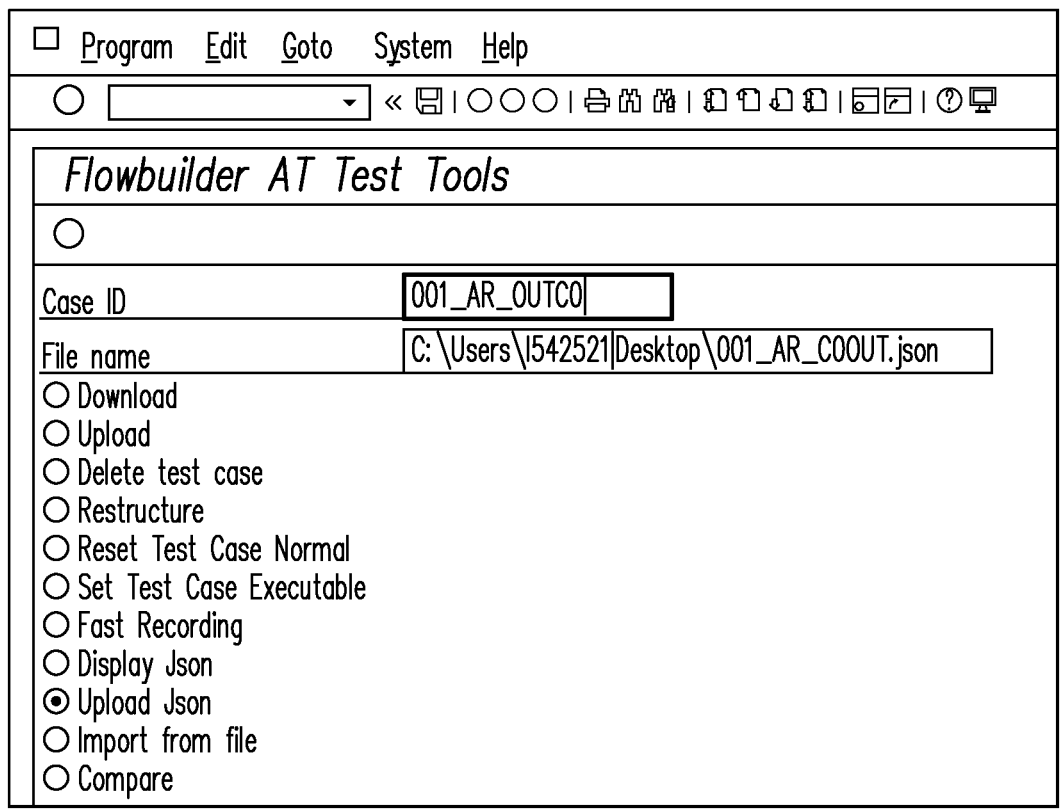
FIG. 8 is a user interface (UI) according to some embodiments.
Figure 9:
FIG. 9 is a user interface (UI) according to some embodiments.
Figure 10:
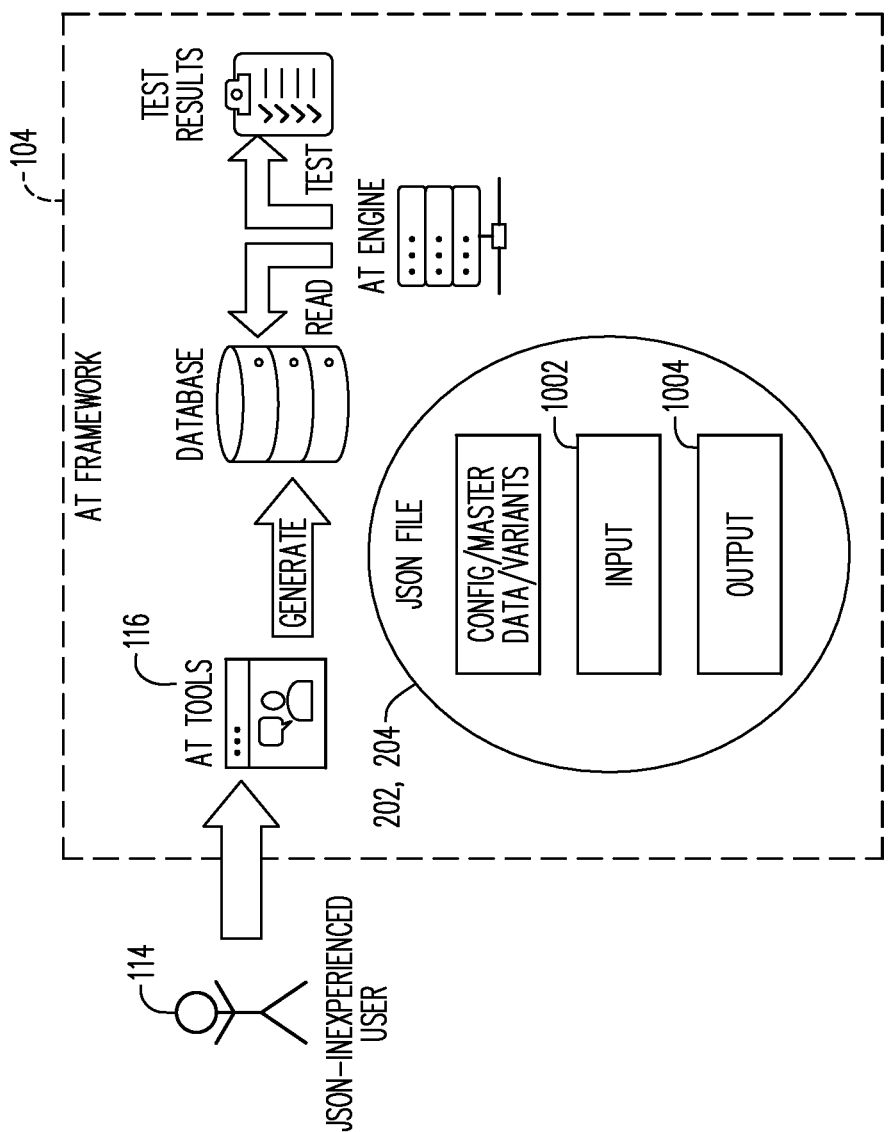
FIG. 10 is a block diagram of a JSON-inexperienced user flow according to some embodiments.
Figure 11:
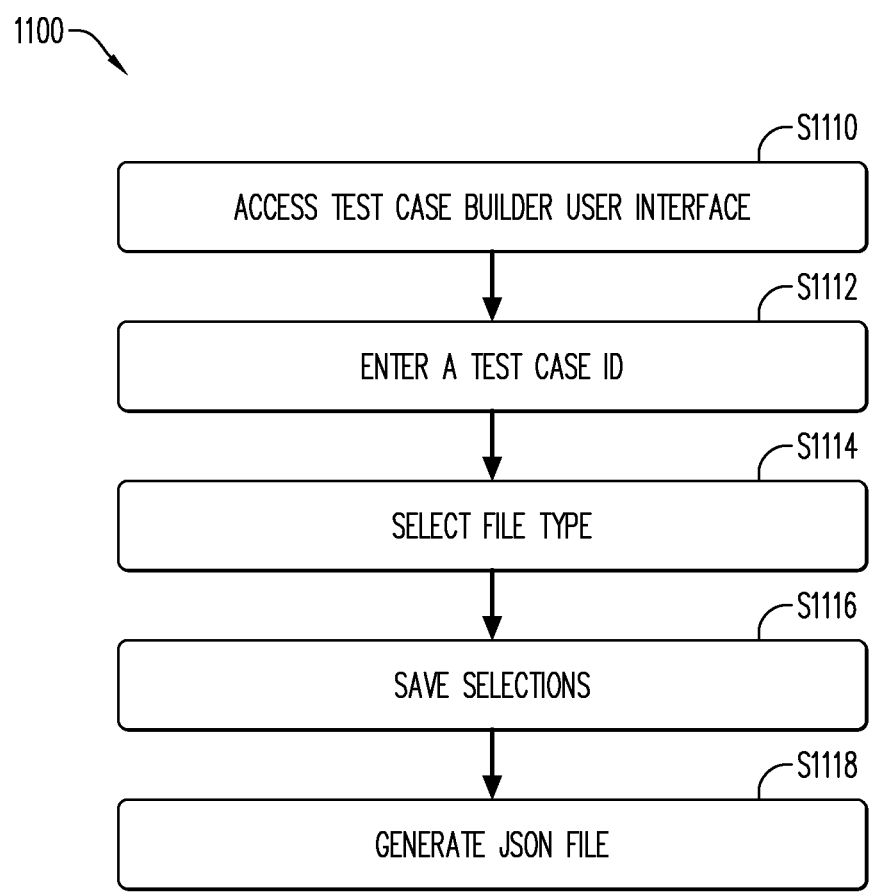
FIG. 11 is a flow diagram of a process according to some embodiments.
Figure 12:
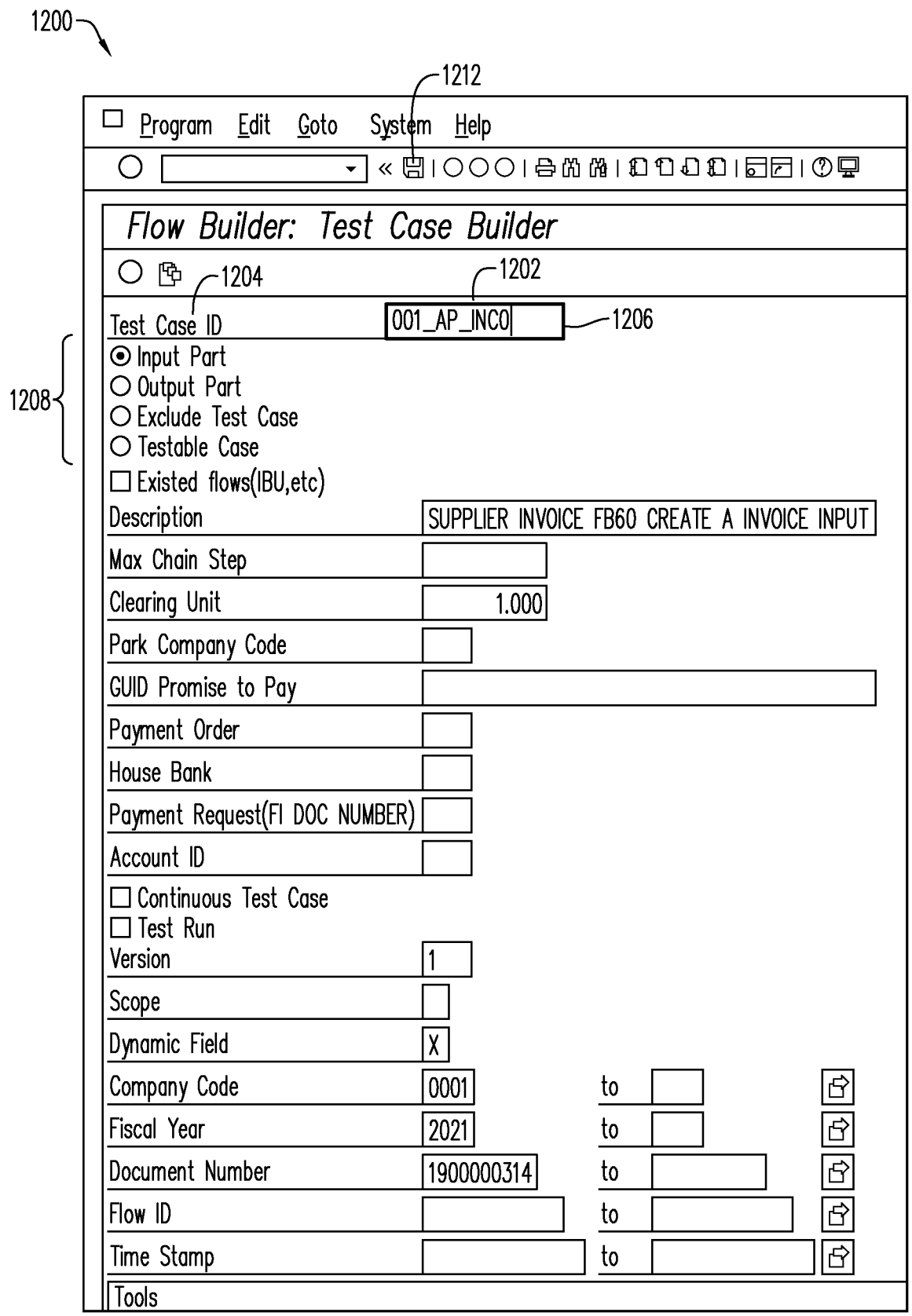
FIG. 12 is a user interface (UI) according to some embodiments.
Figure 14:
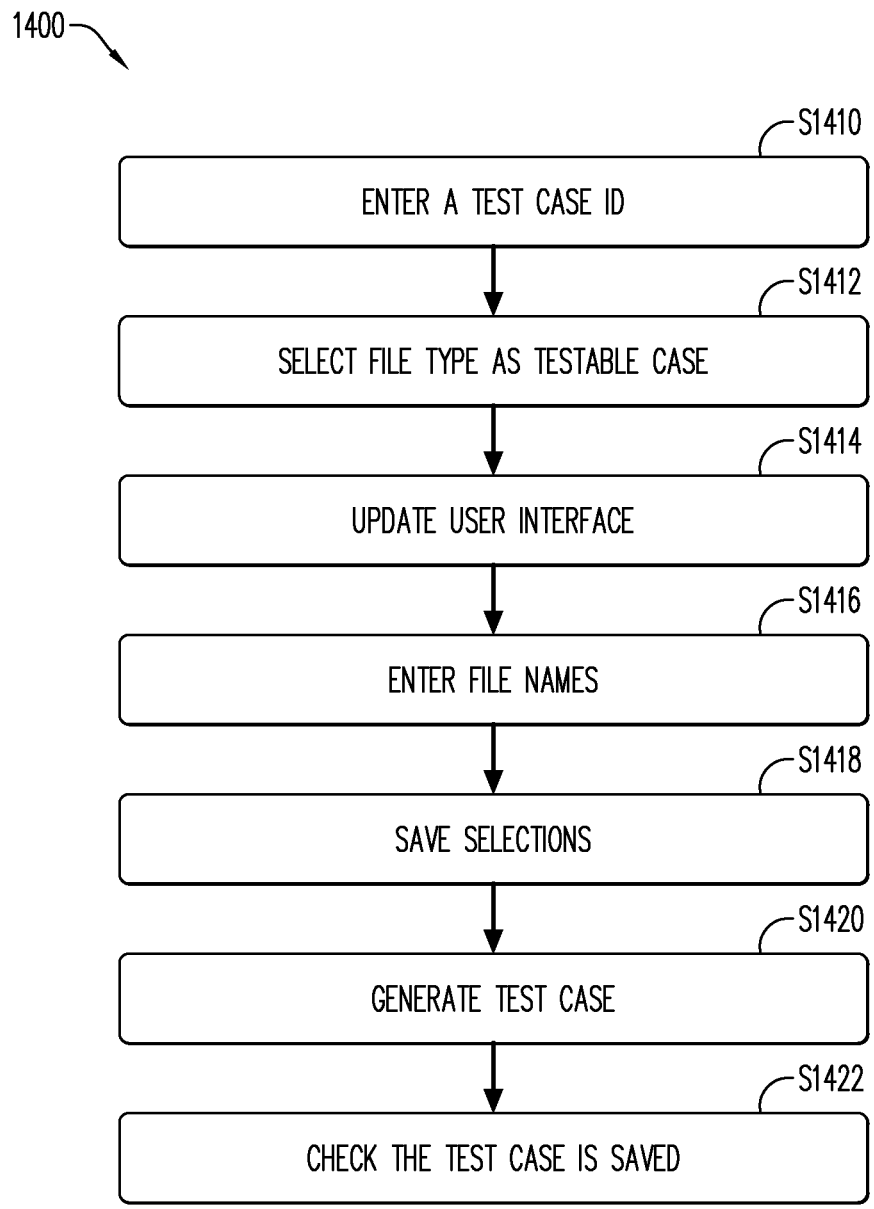
FIG. 14 is a flow diagram of a process according to some embodiments.
Figure 15:
FIG. 15 is a user interface (UI) according to some embodiments.

FIG. 5 describes a process 500 for generating and executing a test case, FIG. 7 describes a process 700 of writing a test case by JSON-experienced user 112, FIG. 11 describes a process for 1100 for writing a test case by a JSON-inexperienced user 114, FIG. 14 describes a process 1400 for combining an input and output file. Processes 500/700/1100/1400 may be executed by server 102 (FIG. 1) according to some embodiments. In one or more embodiments, the server 102 may be conditioned to perform the process 500/700/1100/1400, such that a processing unit 1810 (FIG. 18) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S510 a JSON file 202 is generated. Generation of the JSON file 202 is described further below. The generated JSON file 202 is at the AT tool 116. The generated JSON file 202 may be at the AT tool 116 after having been generated outside of the AT tool 116 and uploaded to the AT tool 116, or having been generated by the AT tool 116 itself.

After the JSON file 202 is generated and at the AT tool 116, it may be validated at S511 with the JSON Schema Matcher 126, and then the AT tool 116 stores the validated JSON file 202 at the database 108 as a test case 120 by uploading the JSON file 202 to the database 108 in S512.

In some embodiments, storing the test case 120 at the database 108 may trigger execution of the test case 120 in S514. The test case 120 may be executed by the AT engine 128, as described above with respect to FIG. 4. As part of the execution, the AT engine 128 may individually read each test case 120 from the database 108 and translate the test case into a structure for execution. The AT engine 128 then translates the JSON file from the test case 120 into other database tables used by the UT framework in execution of the test case. Next, the AT engine 128 mocks up the translated database tables per the existing UT Framework 106 to generate test doubles. Then, the AT engine 128 executes the standard logic (test case) by calling the test doubles, and outputs a test result 122. Next at S516, the AT engine determines whether the test results match the expected results. In a case the test results do not match the expected results, an error notification is generated and transmitted to appropriate parties at S518. In a case the test results do match the expected result, the AT engine determines whether another test case exists at S520. In the case that another test case exists, the process returns to S514. In the case that another test case does not exist, the process 500 ends at S522.

FIGS. 6-9 describe the generation of a JSON file 202 by a JSON-experienced user 112. The JSON-experienced user 112 may be a user who is familiar with the AT framework 104 and is willing to write the test case from scratch. The JSON-experienced user 112 may write the JSON file 202 via any suitable application, including but not limited to Notepad. The JSON-experienced user 112 writes at least one JSON file at S710. The JSON-experienced user 112 may write a single JSON file that includes input 602, output 604, variants and configuration data. Alternatively, the JSON-experienced user 112 may write a JSON file for the input 602, a JSON file for the output 604, and a case JSON file that references both the input 602 and output 604, and includes the configuration and variants. The JSON files may be written at a local computer. Then the local JSON file strings may be uploaded to the AT tool 116 of the AT Framework 104 at S712. In some embodiments, uploading the JSON file strings to the AT tool 116 may result in the JSON Schema Matcher 126 validating the JSON file with the JSON Schema 204, and the AT tool automatically saving the validated JSON file to the database 108 at S714 as a test case 120. Alternatively, the user may select a "generate" button or other selector the generate the test case. A non-exhaustive example of the uploading of the local files may be shown in a UI 800 (FIG. 8) of the AT tool 116. The JSON experienced user 112 may then check in S716 whether the JSON string has been stored in the database 108 as a test case 120. In the UI 900 of FIG. 9, an input JSON string has been stored in the database table with a case ID 902, and a case type 302 as "I", an output JSON string has been stored in the database table with a case type 302 of "O" and the test case JSON string (combining the input and output) has been stored in the database table with a case type 302 of (blank).

FIGS. 10-16 describe the generation of a JSON file 202 by a JSON-inexperienced user 114. The JSON-inexperienced user 114 may be a user with business knowledge to create a test case scenario but may not have the technical knowledge to write the test case in JSON. The JSON-inexperienced user 114 may use the AT tool 116 to write/generate the test case 120. The JSON-inexperienced user 114 accesses a test case builder user interface 1200 of the AT tool 116 at S1110. At S1112, the JSON-inexperienced user 114 may enter a value 1202 for the Test Case ID field 1204 into the corresponding text entry field 1206. Here, the value 1202 is 001_AP_INC0. The JSON-inexperienced user 114 may also select the type 1208 (e.g., input part, output part, exclude test case, testable case, etc.) of JSON file they are writing/generating at S1114. While radio buttons are shown herein, other suitable selectors may be used including but not limited to drop down or other menu with selectable values, a text/data-entry field, etc. Here the type is input part. The JSON-inexperienced user 114 may also enter data into the other fields as-needed and save the selections via selection of a save button 1212 or other suitable saving selector at S1116. In some embodiments, the required fields may be indicated via an asterisk or other indicator. Saving the selections may generate a JSON file in S1118. In some embodiments, the user may select a "generate" button or other selector the generate the JSON file. In this case, the input JSON file 1002 is generated. In one or more embodiments, the AT tool 116 may write the JSON files using the definitions provided by the JSON Schema 204, and the JSON Schema Matcher 126 may validate the written JSON files. The process 1100 may be repeated to create the output JSON file 1004, with the differences being at least a different value for the Test Case ID is entered, and the output part is selected for the type 1208 of JSON file as shown in the UI 1200 in FIG. 13.

A process 1400 to create a testable case 120 via the AT tool 116 is shown in FIG. 14. The same UI for creating the input and output JSON files is provided to the user. As in S1112, the JSON-inexperienced user 114 may enter a value 1402 for the Test Case ID field 1204 into the corresponding text entry field 1206 in S1410. In this process, the JSON-inexperienced user 114 may also select the type 1208 as testable case at S1412. Selection of the testable case type may generate an updated User Interface (UI) 1500 shown in FIG. 15 at S1414. Here, the updated UI 1500 includes an input test case ID field 1502 and an output test case ID field 1504. The Test Case ID field 1506 may be populated with the Test Case ID entered in S1410. The JSON-inexperienced user 114 may enter at S1416 the appropriate case id into the input test case ID field 1502 and output test case ID field 1504 created per the process 1100. The file names may be entered free-form, or selected from a drop-down menu, other menu, or via other suitable selector. The JSON-inexperienced user 114 may also enter data into the other fields as-needed and then save the selections via selection of a save button 1512 or other suitable saving selector at S1418. Saving the selections may generate a test case (including the input, output, variants, configuration) in S1420. Alternatively, the user may select a "generate" button or other selector to generate the test case. In this case, the test case 120 is generated by connecting the input file 1002 and the output file 1004 in a test case JSON that also includes (as added by the AT tool 116) configuration and variants. As described above, the JSON Schema Matcher 126 may validate the generated JSON file to be saved as the test case JSON.

At S1422, the JSON-inexperienced user 114 may check the test case 120 has been saved in the database. In the UI 1600 of FIG. 16, the test case file has been stored in the database table with a case ID 1602 of "001_AR_CO" and a case type 302 of (blank).

In some embodiments, the user 112/114 may create multiple test cases by executing variants of an original test case. With different purposes and granularity, a same input may result in different output, such that the relationship between input and output maybe 1:N. For example, the user may enter one input file and when this input file is executed with different execution variants, the expected output will be different. An execution variant may be, for example, different options to start a program. The variants may be pre-defined parts of the element being tested, as the variants represent the different options/ways you can use the element to retrieve data. As a non-exhaustive example, consider a case where a user has purchased a laptop for $180 and paid taxes on the laptop of $20. The one input file (Input1) includes line items of laptop: 180 and tax: 20. There may be an execution variant to merge tax items that combines the item with the tax to be a single value. The execution variant may be a check-box on a UI provided by the AT tool, for example (or written into the JSON file by the JSON-experienced user, who is familiar with the variants of element being tested), where in a case the box is checked, the values are merged as a first variant (V1) and in a case the box is unchecked, the values are not merged as a second variant (V2). With Input1 and V1, the expected output (EO1) is 200 (180+20), and with Input1 and V2, the expected output (EO2) is 180 and 20. As a non-exhaustive example, consider the UI 1700 in FIG. 17. This UI 1700 may be presented to the JSON-inexperienced user 114 prior to the UI 1300 for creating the output file, as the variant determines what the expected output should be. Changing the output results in a different test case. Here, the variants 1702 may be checkboxes for merge tax item (V1, V2), overwrite AdjActFlow (V3, V4), and show traceability result (V5, V6). With minimal modification to an original test case, there may be fast iteration of multiple test cases, each with a different variant, for example.

Figure 18:
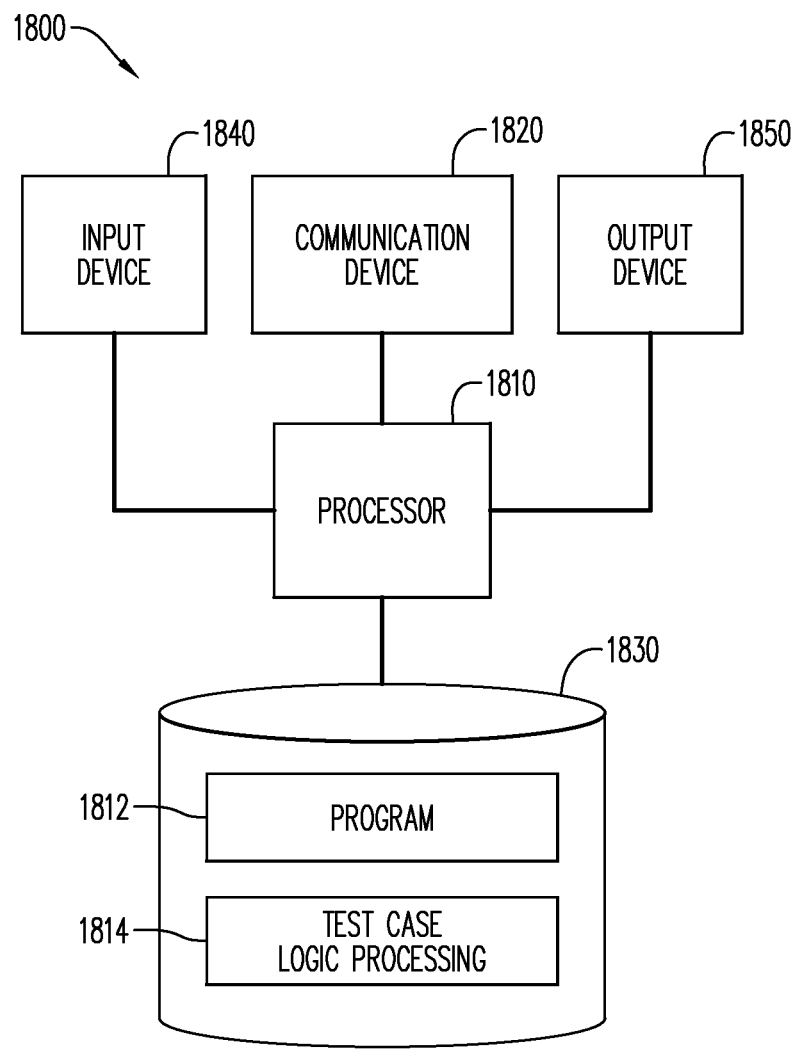
FIG. 18 is a block diagram of an apparatus according to some embodiments.

FIG. 18 is a block diagram of apparatus 1800 according to some embodiments. Apparatus 1800 may comprise a general- or special-purpose computing apparatus and may execute program code to perform any of the functions described herein. Apparatus 1800 may comprise an implementation of one or more elements of system 100. Apparatus 1800 may include other unshown elements according to some embodiments.

Apparatus 1800 includes test case processor 1810 operatively coupled to communication device 1820, data storage device 1830, one or more input devices 1840, one or more output devices 1850 and memory 1860. Communication device 1820 may facilitate communication with external devices, such as server 102. Input device(s) 1840 may comprise, for example, a keyboard, a keypad, a mouse or other pointing device, a microphone, knob or a switch, an infra-red (IR) port, a docking station, and/or a touch screen. Input device(s) 1840 may be used, for example, to manipulate graphical user interfaces and to input information into apparatus 1800. Output device(s) 1850 may comprise, for example, a display (e.g., a display screen) a speaker, and/or a printer.

Data storage device/memory 1830 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices,) etc. and may or may not be included within a database system, a cloud environment, a web server or the like. The storage device 1830 may store software modules or other instructions/executable code which can be executed by the processing unit 1810 to perform the method shown in FIGS. 5, 7, 11, and 14. According to various embodiments, the storage device 1830 may include a data store having a plurality of tables, records, partitions and sub-partitions. The storage device 1830 may be used to store database records, documents, entries, and the like.

The storage device 1830 stores a program 1812 and/or test case platform logic 1814 for controlling the processor 1810. The processor 1810 performs instructions of the programs 1812, 1814, and thereby operates in accordance with any of the embodiments described herein, including but not limited to process 500, 700, 1100, 1400.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

The foregoing diagrams represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

The embodiments described herein are solely for the purpose of illustration. Those in the art will recognize other embodiments may be practiced with modifications and alterations limited only by the claims.

What is claimed is:

1. A system comprising:
a memory storing processor-executable program code; and
a processing unit to execute the executable program code to:
generate, via an automatic testing (AT) tool, a JSON file, wherein the JSON file is validated with a JSON schema, and the validated JSON file comprises a test case;
upload, via the AT tool, the generated test case to a database; and
execute, via an AT engine, the test case in response to uploading the generated test case to the database, wherein execution of the test case further comprises:
reading the test case from the database;
mocking the test case to generate an executable test, including one or more null values based on the generated JSON file;
executing the executable test to generate an output; and
verifying the generated output by comparing the generated output to an expected output in the test case.

2. The system of claim 1, wherein the test case includes one or more inputs, configuration data, one or more variants, and one or more outputs.

3. The system of claim 2, wherein a relationship between inputs and outputs is 1:N.

4. The system of claim 1, wherein the one or more null values are received in one or more fields excluded from testing.

5. The system of claim 4, wherein the fields including the null value are excluded in the generated output and are excluded in the expected output.

6. The system of claim 1, wherein the generated JSON file is written by a user.

7. The system of claim 6, wherein the AT tool is adapted to receive at least one input, at least one output and a test case designation for the received input and the received output.

8. A computer-implemented method comprising:
generating a JSON file;
validating the JSON file with a JSON schema, wherein the validated JSON file comprises a test case;
uploading the generated test case to a database; and
executing the test case in response to uploading the generated test case to the database, wherein execution of the test case further comprises:
reading the test case from the database;
mocking the test case to generate an executable test, including one or more null values based on the generated JSON file, wherein each null value is received in one or more fields excluded from testing;
executing the executable test to generate an output; and
verifying the generated output by comparing the generated output to an expected output in the test case.

9. The computer-implemented method of claim 8, wherein the test case includes one or more inputs, configuration data, one or more variants, and one or more outputs.

10. The computer-implemented of claim 9, wherein a relationship between inputs and outputs is 1:N.

11. The computer-implemented method of claim 8, wherein each field including the null value is excluded in the generated output and is excluded in the expected output.

12. The computer-implemented method of claim 8, wherein generating the JSON file further comprises:

writing the JSON by one of: a user and an automatic testing (AT) tool.

13. The computer-implemented method of claim 12, further comprising:

receiving, at the AT tool, at least one input, at least one output and a test case designation for the received input and the received output.

14. A non-transitory, computer readable medium having executable instructions stored therein to perform a method, the method comprising:

generating a JSON file;

validating the JSON file with a JSON schema, wherein the validated JSON file comprises a test case;

uploading the generated test case to a database; and executing the test case in response to uploading the generated test case to the database, wherein execution of the test case further comprises:

reading the test case from the database;

mocking the test case to generate an executable test case, including one or more null values based on the generated JSON file;

executing the executable test case to generate an output; and verifying the generated output by comparing the generated output to an expected output in the test case.

15. The non-transitory, computer readable medium of claim 14, wherein the test case includes one or more inputs, configuration data, one or more variants, and one or more outputs.

16. The non-transitory, computer readable medium of claim 14, wherein each null value is received in a field excluded from testing, and the field including the null value is excluded in the generated output and is excluded in the expected output.

17. The non-transitory, computer readable medium of claim 14, wherein generating the JSON file further comprises:

writing the JSON by one of: a user and a test case builder tool.

18. The non-transitory, computer readable medium of claim 14, wherein a relationship between inputs and outputs is 1:N.

19. The non-transitory, computer readable medium of claim 14, further comprising:

receiving at least one input, at least one output and a test case designation for the received input and the received output.

* * * * *